United States Patent
Hekstra et al.

(10) Patent No.: US 12,523,743 B2
(45) Date of Patent: Jan. 13, 2026

(54) RADAR RECEIVER

(71) Applicant: NXP B.V., Eindhoven (NL)

(72) Inventors: Andries Pieter Hekstra, Waalre (NL); Alessio Filippi, Eindhoven (NL); Arie Geert Cornelis Koppelaar, Giessen (NL); Ryan Haoyun Wu, San Jose, CA (US); Dongyin Ren, East Brunswick, NJ (US); Feike Guus Jansen, Eindhoven (NL); Jeroen Overdevest, Eindhoven (NL); Joerg Heinrich Walter Wenzel, Hamburg (DE)

(73) Assignee: NXP B.V., Eindhoven (NL)

( * ) Notice: Subject to any disclaimer, the term of this patent is extended or adjusted under 35 U.S.C. 154(b) by 406 days.

(21) Appl. No.: 18/182,763

(22) Filed: Mar. 13, 2023

(65) Prior Publication Data
US 2023/0305104 A1 Sep. 28, 2023

(30) Foreign Application Priority Data
Mar. 24, 2022 (EP) .................................... 22164181

(51) Int. Cl.
*G01S 7/35* (2006.01)
*G01S 13/58* (2006.01)

(52) U.S. Cl.
CPC ............ *G01S 7/354* (2013.01); *G01S 13/584* (2013.01); *G01S 7/356* (2021.05)

(58) Field of Classification Search
CPC ...... G01S 13/931; G01S 13/584; G01S 7/356; G01S 7/354

(Continued)

(56) References Cited

U.S. PATENT DOCUMENTS 4,616,227 A * 10/1986 Homma .............. G01S 13/9004
342/25 A
6,448,923 B1 * 9/2002 Zmic ..................... G01S 13/951
342/195

(Continued)

FOREIGN PATENT DOCUMENTS

CN 107290724 B 5/2020

OTHER PUBLICATIONS

Agrawal, R.C., "The Discrete Hough Transform: A Novel Technique for Detecting Straight Lines in Binary Images", Department of Electrical Engineering, Indian Institute of Technology, Mar. 20, 2015.

(Continued)

*Primary Examiner* — Michael W Justice

(57) ABSTRACT

A radar receiver comprising: an ADC (510) that samples analogue intermediate frequency, IF, signalling in order to generate digital signalling, wherein the digital signalling comprises a plurality of digital-values; a digital processor that populates a 2-dimensional array of bin-values based on the digital-values, such that: a first axis of the 2-dimensional array is a fast time axis and a second axis of the 2-dimensional array is a slow time axis; and a sampling-rate-adjuster that is configured to set a sampling rate associated with the bin-values in the 2-dimensional array based on an index of the slow time axis. The digital processor also performs DFT calculations on the bin-values in the 2-dimensional array along the fast time axis and the slow time axis in order to determine the range and velocity of any detected objects.

20 Claims, 7 Drawing Sheets

(58) Field of Classification Search
USPC .................................. 342/196, 192, 130, 70
See application file for complete search history.

(56) References Cited

U.S. PATENT DOCUMENTS

| | | | | |
|---|---|---|---|---|
| 6,603,424 | B1* | 8/2003 | Abatzoglou | G01S 13/904 342/25 R |
| 7,064,702 | B1* | 6/2006 | Abatzoglou | G01S 13/9019 342/25 R |
| 7,259,714 | B1* | 8/2007 | Cataldo | G01S 13/5246 342/91 |
| 9,835,723 | B2* | 12/2017 | Jansen | G01S 13/343 |
| 10,270,547 | B2* | 4/2019 | Pratt | H04L 27/34 |
| 10,637,641 | B2* | 4/2020 | Iranpour | H04J 3/0638 |
| 10,838,061 | B1* | 11/2020 | Crouch | G01S 17/36 |
| 11,009,591 | B2* | 5/2021 | Eshet | G01S 13/584 |
| 11,313,949 | B2* | 4/2022 | Kipp | G01S 7/4052 |
| 11,448,743 | B2* | 9/2022 | Mende | G01S 13/536 |
| 11,567,183 | B2* | 1/2023 | Wang | G01S 7/41 |
| 11,709,247 | B2* | 7/2023 | Heller | G01S 13/534 342/175 |
| 11,774,572 | B2* | 10/2023 | Barra | G01S 7/536 342/115 |
| 12,007,468 | B2* | 6/2024 | Campbell | G01S 7/292 |
| 12,019,151 | B2* | 6/2024 | Giere | G01S 13/343 |
| 12,066,520 | B2* | 8/2024 | Wu | G01S 7/288 |
| 12,372,634 | B2* | 7/2025 | Wang | G01S 7/4065 |
| 2007/0200750 | A1* | 8/2007 | Cataldo | G01S 13/22 342/91 |
| 2016/0124086 | A1* | 5/2016 | Jansen | G01S 13/931 342/107 |
| 2016/0277132 | A1* | 9/2016 | Pratt | H04B 7/10 |
| 2020/0191935 | A1* | 6/2020 | Mende | G01S 13/536 |
| 2020/0200891 | A1* | 6/2020 | Barra | G01S 15/586 |
| 2020/0249315 | A1* | 8/2020 | Eshet | G01S 13/343 |
| 2021/0018594 | A1* | 1/2021 | Kipp | G01S 7/4052 |
| 2021/0072381 | A1* | 3/2021 | Crouch | G01S 7/4917 |
| 2021/0318424 | A1* | 10/2021 | Wang | G01S 7/288 |
| 2022/0091251 | A1* | 3/2022 | Heller | G01S 13/584 |
| 2022/0221569 | A1* | 7/2022 | Wang | G01S 13/343 |
| 2022/0334240 | A1* | 10/2022 | Wu | G01S 13/582 |
| 2022/0390555 | A1 | 12/2022 | Wu et al. | |
| 2023/0043829 | A1* | 2/2023 | Giere | G01S 13/343 |
| 2024/0012127 | A1* | 1/2024 | Campbell | G01S 13/582 |

OTHER PUBLICATIONS

Carlson, B.D., "Search Radar Detection and Track with the Hough Transform, Part I: System Concept", IEEE Transactions on Aerospace and Electronic Systems, vol. 30, No. Jan. 1, 1994.

Carlson, B.D., "Search Radar Detection and Track with the Hough Transform, Part II: Detection Statistics", IEEE Transactions on Aerospace and Electronic Systems vol. 30, No. Jan. 1, 1994.

Carlson, B.D., "Search Radar Detection and Track with the Hough Transform, Part II: Detection Performance with Binary Integration", IEEE Transactions on Aerospace and Electronic Systems, vol. 30, No. Jan. 1, 1994.

Carlson, B.D., "Errata: Search Radar Detection and Track with the Hough Transform", IEEE Transactions on Aerospace and Electronic Systems, vol. 39, No. 1, Jan. 2003.

Dipietro, R., "Imaging of Moving Targets using Synthetic Aperture Radar", IEEE Antennas and Propagation Society International Symposium 1997 Digest, Jul. 13-18, 1997.

Hakobyan, G., "Repeated Symbols OFDM-MIMO Radar at 24 GHz", 2016 European Radar Conference (EuRAD), Oct. 5-7, 2016.

Hakobyan, G., "Orthogonal Frequency Division Multiplexing Multiple-Input Multiple-Output Automotive Radar with Novel Signal Processing Algorithms", Ph.D. thesis, Stuttgart univ., Jul. 2018.

Hakobyan, G., "High-Performance Automotive Radar", Advances in Radar Systems for Modern Civilian and Commercial Applications: Part 2, IEEE Signal Processing Magazine, pp. 32-44, vol. 36, No. 5, Sep. 9, 2019.

Longman, O., "Spectral Radon-Fourier Transform for Automotive Radar Applications", IEEE Transactions on Aerospace and Electronic Systems, vol. 57, Issue 2, Apr. 2021.

Nagano, T., "Range Migration Compensation for Moving Targets with Unknown Constant Velocity in Chirp Radars", Proceedings of the 8th European Radar Conference, Oct. 12-14, 2011.

Perry, R.P., "Coherent Integration With Range Migration Using Keystone Formatting", 2007 IEEE Radar Conference, Apr. 1, 2007.

Richards, A., "The Keystone Transformation for Correcting Range Migration in Range-Doppler Processing", Georgia Tech Research Institute, Mar. 28, 2014.

Roos, F., "Range Migration Compensation for Chirp-Sequence based Radar", GeMiC 2016 • Mar. 14-16, 2016.

Sen, W., "Range migration compensation for moving targets in chirp radars with stepped frequency", The Journal of Engineering, IET International Radar Conference (IRC 2018), Accepted on May 3, 2019.

Thomas, D., "Advanced Processing Techniques", 2019 IEEE Radar Conference (RadarConf), Apr. 22-26, 2019.

Uysal, F., "Comparison of range migration correction algorithms for range-Doppler processing", Journal of Applied Remote Sensing, vol. 11, Jul. 2017.

Wang, L., "Radon-Fourier Transform in FMCW Radar", 2020 IEEE Radar Conference (RadarConf20), Sep. 21-25, 2020.

Wang, Y., "A Parameter-Adjusting Polar Format Algorithm for Extremely High Squint SAR Imaging", IEEE Transactions on Geoscience and Remote Sensing, vol. 52, No. 1, Jan. 2014.

Xu, J., "Long-time coherent integration for radar target detection base on Radon-Fourier transform", 2010 IEEE Radar Conference, May 10-14, 2010.

Xu, J., "Joint Radar Wideband Beamforming and Long-Time Coherent Integration Via Radon-Fourier Transform", Proceedings of the 2011 IEEE CIE International Conference on Radar, Oct. 24-27, 2011.

Xu, J., "Radon-Fourier transform for Radar Target Detection (III): Optimality and fast implementations," IEEE Trans. on Aerosp. and Electr. Systems, vol. 48, No. 2, Apr. 2012.

Xu, L., "Doppler-Range Processing for Enhanced High-Speed Moving Target Detection Using LFMCW Automotive Radar", IEEE Transactions on Aerospace and Electronic Systems, vol. 58, No. 1, Feb. 2022.

* cited by examiner

RADAR RECEIVER

CROSS-REFERENCE TO RELATED APPLICATIONS

This application claims the priority under 35 U.S.C. § 119 of European Patent application no. 22164181.4, filed on 24 Mar. 2022, the contents of which are incorporated by reference herein.

FIELD

The present disclosure relates to radar receivers and associated methods. In particular to radar receivers and methods that can mitigate a loss of sensitivity that can occur when an object that is to be detected is in motion.

SUMMARY

According to a first aspect of the present disclosure there is provided a radar receiver comprising:
   an analogue to digital converter, ADC, that is configured to sample analogue intermediate frequency, IF, signalling according to a sampling rate in order to generate digital signalling, wherein the digital signalling comprises a plurality of digital-values;
   a digital processor that is configured to populate a 2-dimensional array of bin-values based on the digital-values, such that: a first axis of the 2-dimensional array is a fast time axis and a second axis of the 2-dimensional array is a slow time axis;
   a sampling-rate-adjuster that is configured to set a sampling rate associated with the bin-values in the 2-dimensional array based on an index of the slow time axis; and
   wherein the digital processor is further configured to perform DFT calculations on the bin-values in the 2-dimensional array along the fast time axis and the slow time axis in order to determine the range and velocity of any detected objects.

In this way, the DFT calculations along the slow time axis captures a greater amount of energy associated with a moving object, thereby improving the sensitivity for detecting objects that have a particular range.

In one or more embodiments, the sampling-rate-adjuster is configured to set the sampling rate associated with the bin-values in the 2-dimensional array based on: (i) the index of the slow time axis; and (ii) a targeted range/velocity ratio.

In one or more embodiments, the digital processor is configured to populate the 2-dimensional array of bin-values based on the digital-values, such that each index of the slow time axis represents a different radar chirp in the IF signalling. The sampling-rate-adjuster can be configured to set the frequency-shift for each chirp based on its associated index on the slow time axis.

In one or more embodiments, the sampling-rate-adjuster comprises a clock unit, which provides a clock-signal to the ADC for setting the sampling rate of the ADC based on the frequency of the clock-signal. The digital processor can be configured to adjust the frequency of the clock-signal based on the index of the slow time axis. The digital processor can be configured to populate the 2-dimensional array of bin-values with the digital-values.

In one or more embodiments, the sampling-rate-adjuster is configured to resample the digital-values to generate resampled-digital-values, such that the sampling rate associated with the resampled-digital-values is based on the index of the slow time axis. The digital processor can be configured to populate the 2-dimensional array of bin-values with the resampled-digital-values.

In one or more embodiments, the sampling-rate-adjuster is configured to modify the DFT calculations based on the index of the slow time axis.

In one or more embodiments, the sampling-rate-adjuster is configured to modify the DFT calculations by adding or removing bin-values based on the index of the slow time axis.

In one or more embodiments, the sampling-rate-adjuster is configured to modify the DFT calculations by applying a mathematical operation to a component of the DFT calculation, wherein the magnitude of the mathematical operation is based on the index of the slow time axis.

In one or more embodiments, the sampling-rate-adjuster is configured to set the sampling rate associated with the bin-values in the 2-dimensional array based on an index of the fast time axis.

In one or more embodiments, the sampling-rate-adjuster is configured to set the sampling rate associated with the bin-values in the 2-dimensional array such that the sampling rate for the maximum index of the slow time axis corresponds to a maximum range/maximum velocity of the radar receiver. In some examples this may be the maximum unambiguous range/maximum unambiguous velocity of the radar receiver. In other examples, velocity disambiguation techniques can be applied in the radar receiver, in which <maximum velocity>=<maximum unambiguous velocity><velocity disambiguation factor>. Where 'disambiguation' refers to de-aliasing as in Nyquist sampling: the same bandwidth is used multiple times, corresponding frequency axes are concatenated.

In one or more embodiments, the sampling-rate-adjuster is also configured to set the sampling rate associated with the bin-values in the 2-dimensional array based on the speed of a vehicle to which the radar receiver is fitted.

In one or more embodiments, the sampling-rate-adjuster is configured to set a sampling rate associated with the bin-values in the 2-dimensional array based on an index of the slow time axis, by applying a linear function to the index of the slow time axis to set the sampling rate.

In one or more embodiments, the sampling-rate-adjuster is configured to set a sampling rate associated with the bin-values in the 2-dimensional array based on an index of the slow time axis, by applying a non-linear function to the index of the slow time axis to set the sampling rate.

In one or more embodiments, the radar receiver is further configured to: apply an offset to one or both of the determined range and velocity. In this way, the origin of the range-velocity plane can be redefined, e.g. as they occur in said range to velocity ratio.

There is also disclosed a radar system comprising a plurality of any of the radar receivers disclosed herein, wherein the radar system is configured to combine the velocity that is determined by each of the radar receivers to determine: a combined velocity value for a detected object, and optionally a direction to the detected object.

According to a further aspect of the present disclosure, there is provided a computer-implemented method of determining the velocity of a detected object, the method comprising:
   sampling analogue intermediate frequency, IF, signalling according to a sampling rate in order to generate digital signalling, wherein the digital signalling comprises a plurality of digital-values;

populating a 2-dimensional array of bin-values based on the digital-values, such that: a first axis of the 2-dimensional array is a fast time axis and a second axis of the 2-dimensional array is a slow time axis;

setting a sampling rate associated with the bin-values in the 2-dimensional array based on an index of the slow time axis; and performing DFT calculations on the bin-values in the 2-dimensional array along the fast time axis and the slow time axis in order to determine the range and velocity of any detected objects.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
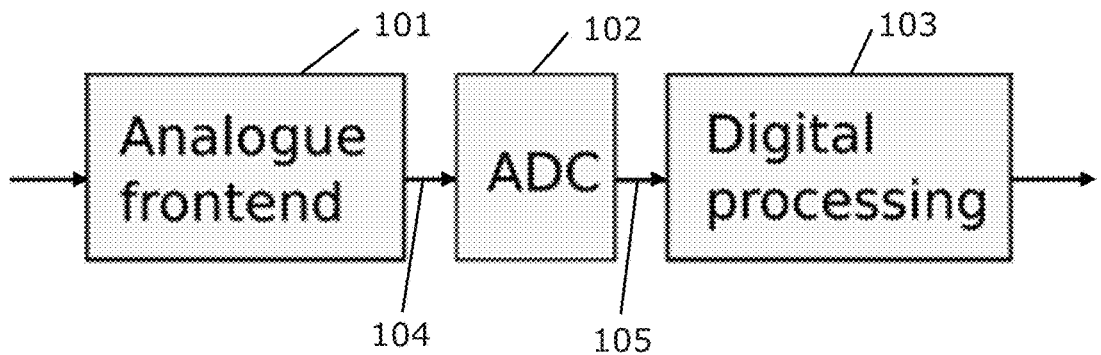
FIG. 1 shows an Frequency Modulated Continuous Wave (FMCW) radar receiver.

Radar has a long history in the military domain and in other markets such as avionics and shipping. Radar systems described herein are particularly well-suited to radar applications in the consumer market such as automotive radars. In such applications, the complexity and cost of the radar system needs to be a small fraction of the cost of the consumer good that the radar system is a part of. In 2021, next generations of cars are being designed with tens of radar integrated circuits (ICs) per car, providing a wide range of services to the driver. Examples of performance dimensions for such radar ICs include the following:

Sensitivity of detecting objects with small radar cross section at a large distance.

Accuracy of object locations and velocities detected by the radar.

Power consumption.

In automotive applications in particular, the introduction of processing methods/circuits that improve the performance of a radar IC should cause minimal additional IC area and/or power consumption.

In general, the detectability of objects by a radar is limited by the so-called channel noise present at the input of the radar receiver, where multiple noise sources add up. Such noise sources can include:

Radio noise that impinges upon the radar receive antennas.

Additive thermal noise from the first input resistances in an analogue frontend of the radar receiver.

Multiplicative phase noise from frequency mixing with (intermediate) carrier frequencies obtained from a Phased Locked Loop (PLL).

Interference from other radars in the same frequency band and/or other radio transmitters in adjacent spectral bands.

As automotive radars illuminate their own targets, the energy transmitted by the radar towards radar objects decays along both:

the propagation path(s) from the transmit antenna(s) to the object, e.g. inversely proportional to the square of the distance between transmitter and object (referred to as range r), and the propagation path(s) from the radar object back to the receive antenna(s), e.g. following the same power law.

Consequently, for a given radar cross section of a radar object, the received signal strength can decay inversely proportionally to the fourth power of the range. It is important that advanced signal processing combines the received radar signal across a time interval of sufficient duration in order to accumulate a total detected signal value above the channel noise for important categories of radar objects, such as:

targets that are relatively small or do not reflect the radar signal very well (e.g. pedestrians),
objects at relatively large distance to the radar.

The detectability of radar objects may be limited by:
the limited radar antenna output power, e.g. from government regulations,
the two-way path loss of the radio energy between the transmit antennas, the radar object and the receive antennas, as discussed above,
the channel noise in the radar receiver, again as discussed above.

In addition, the detectability of radar objects may also be limited for objects that have a high velocity relative to the radar. If the object motion within a single radar measurement time is not negligible relative to the resolution of the range measurement (range_resolution=c/(2B); where c is the speed of light and B is the RF bandwidth), then motion blur can occur. This can also be known as displacement. For instance, a high speed object may displace itself 1 or 2 meters during the collection of a data cube or frame of FMCW radar baseband samples (as discussed below). If the radar has a range resolution of some tens of centimetres, the object can traverse through 5 to 10 pixels/bins in the radar's range-velocity "image" during measurement. The received signal energy (after range and Doppler processing) associated with that object is thereby smeared, more or less evenly, across these pixels/bins, instead of the energy being concentrated in a single or a few pixels/bins. Consequently, the energy in each of these pixels/bins is lowered to a degree where it may not be discernible from the channel noise with sufficient statistical confidence. In which case, the object can go undetected.

In the case of an automotive radar, for a given maximum allowed velocity on a road, the maximum (absolute value of) the relative radial velocity of two opposing cars is twice as high as the radial velocity of the individual cars. The maximum speed difference that needs to be supported by the radar hardware and software may differ per application or use case of the radar. The maximum displacement of a radar object within the radar measurement time equals the product of this radar measurement time and the maximum relative radial velocity of an object relative to the radar that needs to be supported. In the step towards a next generation of an existing radar chip design, the support of additional applications or use cases may increase the ratio between measurement time and distance resolution that needs to be considered. For instance, in the design of a radar used in an automotive parking application, the velocity of the car itself can be assumed to be small. Then, a successor product may e.g. also cover lane change assist functions, and need to include larger differential velocities between the car carrying the radar and other objects. An increase of the radar measurement time can help to increase the sensitivity of the radar chip. The introduction of compensation means for motion blur in the receive chain may enable such an increase of supported object velocity and radar measurement time.

FIG. 1 shows an Frequency Modulated Continuous Wave (FMCW) radar receiver. In stretch processing based FMCW radar, the received radar signal is multiplied with the (complex conjugate) of the transmitted signal, where the transmitted signal is a linear frequency ramp. With a suppressed high frequency component, this product signal is called the beat signal. This way, the two-way propagation delay from the radar transmit antennas to the radar object and back to the radar receive antennas is translated into a proportional difference frequency component ("beat frequency") per observed object.

In the analysis and computer simulation of radar systems, it can often suffice to model object with a limited number of parameters:
the distance to the radar, called the range r,
the radial velocity v of the object relative to the radar, and
the effective reflection area or the radar cross section of the object.

That is, the acceleration of the object during the measurement of the radar frame can often, but not always, be neglected.

The FMCW radar receiver of FIG. 1 includes an analogue frontend 101 that multiplies analogue signalling received from a radar antenna by the transmitted signalling in order to provide analogue intermediate frequency (IF) signalling 104. As discussed above, this IF signalling 104 can also be referred to as beat signalling. The analogue frontend 101 provides the analogue IF signalling 104 to an analogue to digital converter (ADC) 102. The analogue frontend 101 can apply a low-pass and a high pass filter. Also, as is known in the art, the FMCW radar receiver can include a real or quadrature reception paths. The ADC 102 samples the analogue IF signalling 104 according to a sampling rate in order to generate digital signalling 105. The digital signalling 105 comprises a plurality of digital-values.

The ADC 102 then provides the digital signalling 105 to a digital processor 103. The digital processor 103 populates a 2-dimensional array of bin-values with the digital-values of the digital signalling 105.

Figure 2:
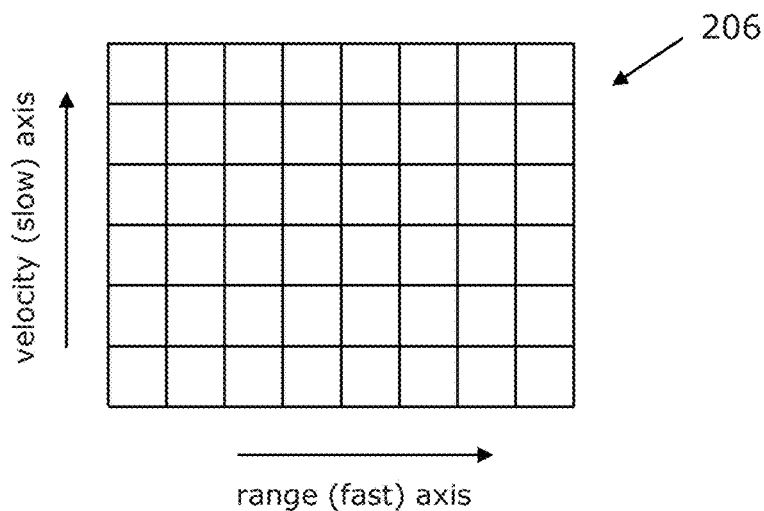
FIG. 2 shows an example of a 2-dimensional array of bin-values, for a single antenna element.

FIG. 2 shows an example of a 2-dimensional array 206 of bin-values, for a single antenna element. The digital-values of the digital signalling are populated into the 2-dimensional array 206 starting at the bottom left bin/cell of the 2-dimensional array 206, and then along the bottom row to the right. The entire bottom row of bin-values corresponds to a single waveform of radar data, which in this example is a single frequency ramp. The data-values that correspond to a second waveform of radar data are then populated into the next row (the one above the bottom row). Additional rows of bin-values are populated with digital-values for subsequent waveforms of radar data until all of the rows have been populated and the 2-dimensional array 206 of data that will be used for radar measurement is complete. As is known in the art, a first axis of the 2-dimensional array 206 is a fast time axis, and is the horizontal axis in FIG. 2. A set of (horizontal) DFTs is then performed on the bin-values along the fast time axis, following which the axis can be referred to as a range axis. A second axis of the 2-dimensional array 206 is a slow time axis, and is the vertical axis in FIG. 2. A set of (vertical) DFTs is then performed on the bin-values along the slow time axis, following which the axis can be referred to as a velocity axis. This is the exploitation of the Doppler effect that displacement causes phase rotation; displacement at a certain rate, that corresponds to a certain velocity, causes a certain vertical frequency component. In some examples, these DFT (discrete Fourier transforms) can be implemented as FFTs (fast Fourier transforms). It will be appreciated that any reference to FFT herein can be considered as a specific implementation, and that the corresponding functionality can be provided more generally as a DFT.

In this way, for range-Doppler processing in radar systems, the time index within a single waveform (which may be a radar pulse, FMCW chirp, OFDM radar symbol, etc.), that allows determination of the range of objects, is referred to as the fast time axis (the horizontal axis in FIG. 2). A coarser time axis, across a sequence of subsequent waveforms within a single radar measurement, that, through the Doppler effect, allows determination of the object velocities, is referred to as the slow time axis (the vertical axis in FIG. 2).

In conventional implementations, the contribution of the Doppler effect to the magnitude of the IF oscillation frequency is negligible. In that case, a range and velocity pair (r,v) of a radar object corresponds to a 2D frequency in a 2D Fourier Fast Transform (FFT) of the received IF signal across the number of chirps in a frame. In this basic channel model, the displacement of objects during the frame time is assumed to be less than one or a few bins of the range-FFT. In the development of early generations of automotive radar chips, this classic model sufficed. 2D phasor matrixes of at the 2D frequencies that correspond to the respective (r,v)-pairs of radar objects need to be summed. The channel noise e.g. adds to this sum.

Figure 3:
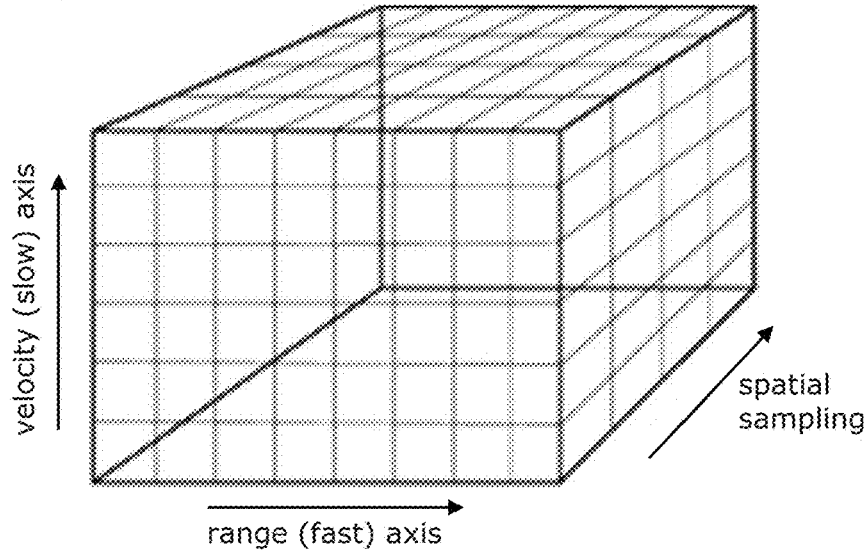
FIG. 3 shows a 3-dimensional array of bin-values for a system that has a plurality of antenna elements.

FIG. 3 shows a 3-dimensional array 307 of bin-values for a system that has a plurality of antenna elements. The 3-dimensional array 307 of bin-values can also be referred to as a data cube, although as will be discussed below the third dimension is typically much smaller than the other two dimensions. The fast and slow axes that are labelled in FIG. 3 correspond to the same axes in FIG. 2. In this way, each 2-dimensional slice of the 3-dimensional array 307 corresponds to digital-values of digital signalling that are provided by a single antenna. Therefore, the number of 2-dimensional slices that are spaced apart in the third dimension (into the page in FIG. 3) corresponds to the number of antenna elements in the radar system. As is known in the art, the use of multiple antenna elements allows beamforming or other angular directive processing.

The collection of ADC samples along the slow time axis of chirp start times, ADC sampled fast time axis, and the axis of respective receive antenna elements, all as shown in FIG. 3, can be referred to as a frame of samples. Returning to FIG. 1, the digital processor 103 can then perform Fast Fourier Transform (FFT) calculations on the 2-dimensional array or FIG. 2 or the 3-dimensional array of FIG. 3 in order to determine the range/distance to a detected object and/or the velocity of the detected object.

Figure 4:
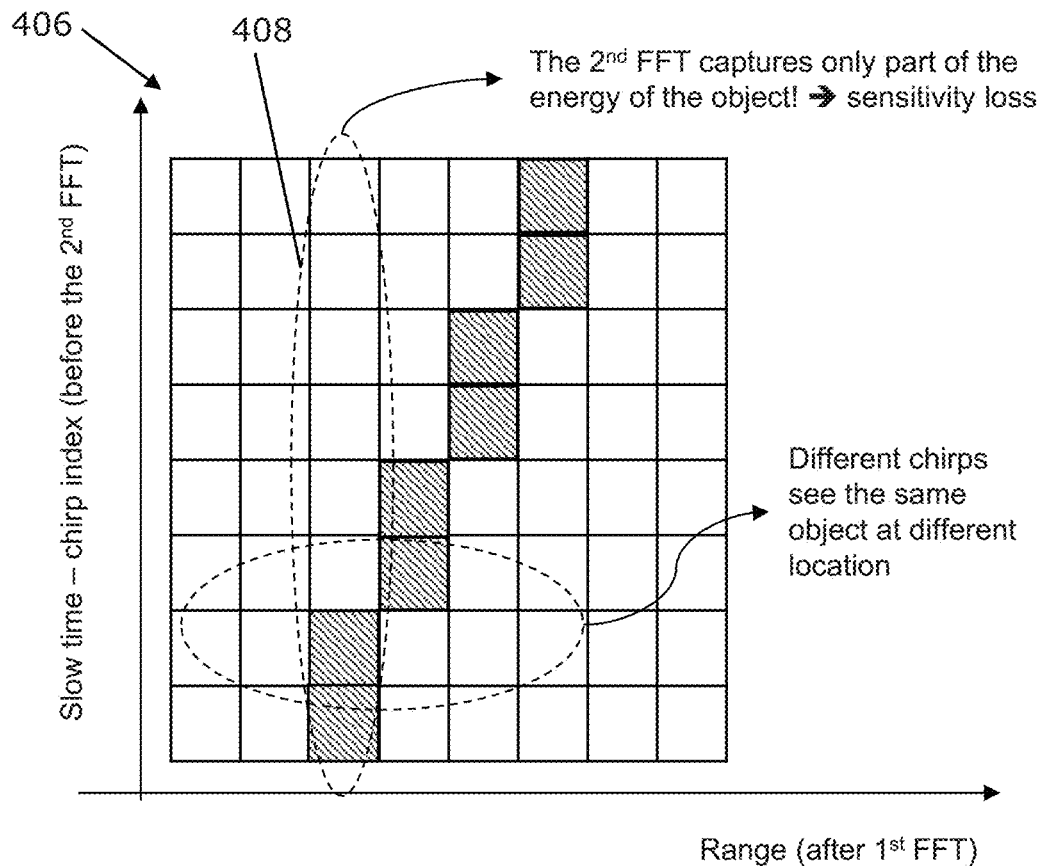
FIG. 4 shows schematically an example of a 2-dimensional array of bins.

FIG. 4 shows schematically an example of a 2-dimensional array 406 of bins. A first FFT has been performed along the range axis for each row of bins (i.e. for each waveform of the radar data), and the bin in which a single object is detected is shown shaded with a diagonal fill. It can be seen in this example that the object is identified in different range bins (i.e. bins with a different range index) for different rows of the 2-dimensional array 406 (i.e. for bins with a different index on the velocity axis). That is, different waveform/chirps see the same object at different locations. This is because the object is in motion radially with respect to the radar antenna. In this example the object is moving away from the radar antenna because its range is increasing along the slow time (vertical) axis.

Once the 2-dimensional array 406 of bins is fully populated with bin-values, and a first set of FFT calculations is performed on the bin-values along the fast time axis (for each slow time index on the vertical axis) yielding a set of spectra along a range axis in order to determine the distance to any detected objects (as illustrated by the cells that are shown shaded with a diagonal fill), a second set of FFT calculations can be performed. The second set of FFT calculations is performed on the bin-values in the 2-dimensional array along the slow time axis (for each fast time index on the horizontal axis) yielding a set of spectra along a velocity axis in order to determine the velocity of any detected objects. An example of one of the second FFT calculations is identified in FIG. 4 with reference 408. It can be seen that, because the detected range of the object has changed over the timeframe that is represented by the 2-dimensional array 406, each one of the second set of FFT calculations captures only part of the energy of the object. This can be considered as the energy associated with the object being smeared across the bins in the range axis, resulting in a loss of sensitivity. This smearing of energy can be considered as motion blur.

One or more of the examples disclosed herein can realize partial compensation for the loss in detected peak height as a result of the motion blur for high velocity objects, at an acceptable implementation cost. As the received signal energy decreases both with the distance to the object from the radar and with the velocity of the object relative to the radar, compensation of motion blur and the loss in detected energy per pixel called peak height in the "large range and large velocity" part of the range-velocity domain of the radar map can be of high importance. Examples are disclosed herein that can improve the sensitivity for detecting an object with a large velocity and a large range (i.e. it is a relatively long way away from the radar antenna). Other examples disclosed herein can improve the sensitivity for detecting an object with a high velocity and a small range.

As will be discussed in detail below, examples disclosed herein can improve the sensitivity by applying a slight change of sample rate per received pulse, chirp, OFDM symbol, in order to compensate for objects of a particular velocity to range ratio. This can reduce or avoid a loss in detected peak height, in particular for objects of both high velocity and high range for which object detection is hampered by both: significant radio propagation path loss in between the radar antennas and the radar object; and significant smearing of the received signal energy associated with the object across a number of bins/pixels, which lowers the detected peak height towards the detection floor of noise and interference from other radio sources.

Figure 5:
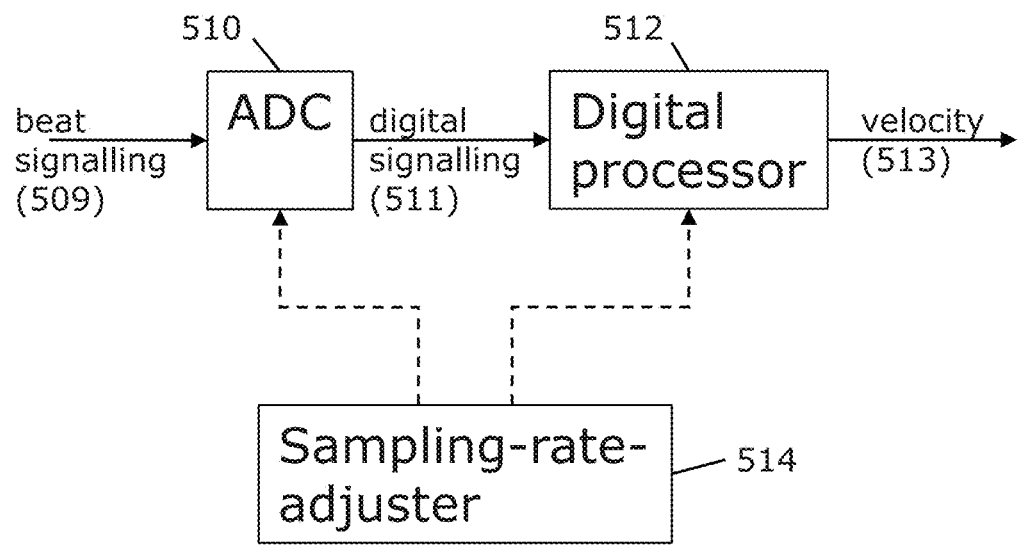
FIG. 5 shows an example embodiment of a radar receiver.

FIG. 5 shows an example embodiment of a radar receiver. The radar receiver includes an analogue to digital converter, ADC, 510 that samples analogue IF signalling 509 according to a sampling rate in order to generate digital signalling 511. As discussed above, the analogue IF signalling 509 can be provided by an analogue front end of the radar receiver, which receives analogue signalling from a radar antenna. The digital signalling comprises a plurality of digital-values.

The radar receiver of FIG. 5 also includes a digital processor 512. The digital processor 512 populates a 2-dimensional array of bin-values based on the digital-values. An example of such a 2-dimensional array of bin-values is shown in FIG. 2. As will be discussed below, the digital processor 512 can populate the 2-dimensional array of bin-values with the digital-values of the digital signalling 511 (i.e. the digital-values can be copied directly into the 2-dimensional array without modification). Alternatively, as also discussed below, the digital processor 512 can perform some processing on the digital-values of the digital signalling 511 and then populate the 2-dimensional array with the processed digital-values. Either way, a first axis of the 2-dimensional array is a fast time axis prior to the first set of FFTs and a range axis afterwards and a second axis of the 2-dimensional array is a slow time axis prior to the second set of FFTs and a velocity axis at the output. As it is known to somebody skilled in the art, a 2-dimensional FFT is a separable operation and can be split into a set of row-wise FFTs followed by a set of column-wise FFT's or vice versa, the net result is that (range, velocity)-pairs of objects are obtained from the energy peaks that are markedly above the channel noise floor in a 2-dimensional FFT that the radar receiver takes (for single antenna case).

The digital processor 512 can then perform FFT calculations on the bin-values in the 2-dimensional array along the velocity axis in order to determine the velocity 513 of any detected objects. Optionally, the digital processor 512 can also perform FFT calculations on the bin-values in the 2-dimensional array along the fast time axis in order to determine the distance to any detected objects.

Advantageously, the radar receiver of FIG. 5 also includes a sampling-rate-adjuster 514. The sampling-rate-adjuster 514 is configured to set a sampling rate associated with the bin-values in the 2-dimensional array based on an index of the slow time axis. As will be discussed in detail below, this can effectively change the position of the detected object in the 2-dimensional array, based on its associated index on the slow time axis, as the length of the frequency axis called range axis becomes slightly dependent on the slow time axis which influences the index that a range of an object needs to be mapped onto. In this way, the FFT calculations along the slow time axis (vertically in FIG. 4) captures a greater amount of energy associated with a moving object (because the energy can be moved left or right in the array of FIG. 4), thereby reducing the loss of sensitivity for objects that have either a small or have a large range.

The functionality of FIG. 5 can be replicated for IF signalling for a plurality of radar antennas, and therefore for a data cube such as the one illustrated in FIG. 3. In which case, a radar system can include a plurality of the radar receivers that are shown in FIG. 5. The radar system can combine the velocity that is determined by each of the individual radar receivers to determine a combined velocity value for a detected object, and optionally a direction to the detected object.

Figure 6:
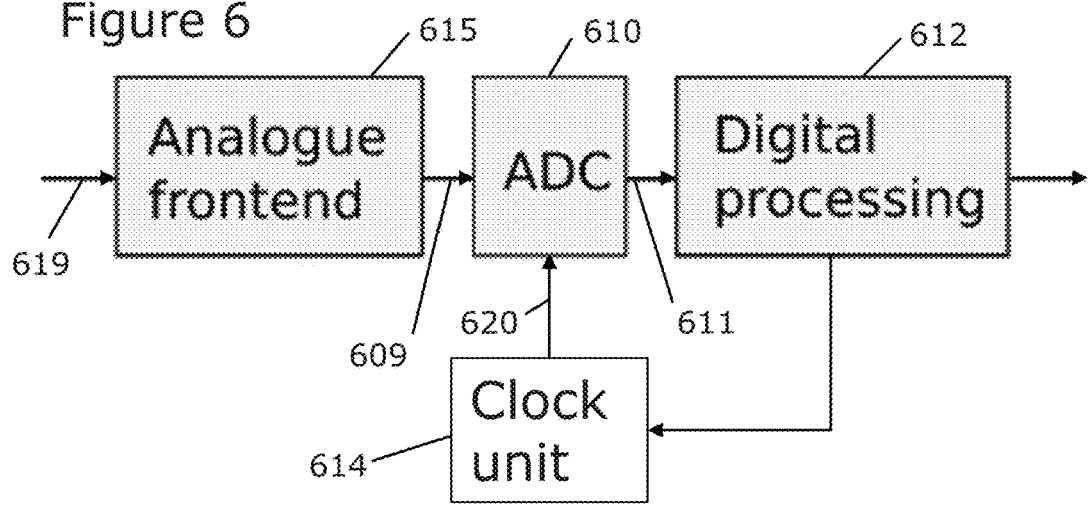
FIG. 6 shows another example of a radar receiver, in which a clock unit is controlled in order to set a sampling rate associated with the bin-values in the 2-dimensional array.

FIG. 6 shows another example of a radar receiver, in which a clock unit 614 is controlled in order to set a sampling rate associated with the bin-values in the 2-dimensional array.

In FIG. 6, an analogue frontend 615 is also shown. The analogue frontend 615 receives analogue signalling 619 from a radar antenna (not shown), and provides analogue IF signalling to an ADC 610. As with FIG. 5, the ADC 610 of FIG. 6 samples the analogue IF signalling 609 according to a sampling rate in order to generate digital signalling 611, which comprises a plurality of digital-values.

The clock unit 614 provides a clock-signal 620 to the ADC 610 for setting the sampling rate of the ADC 610 based on the frequency of the clock-signal 620. The digital processor 612 can adjust the frequency of the clock-signal 620 based on the index of the slow time axis. The digital processor 612 can also populate the 2-dimensional array of bin-values with the digital-values (i.e. it can copy the digital-values directly into the 2-dimensional array without necessarily processing or modifying the digital-values). In this way, the radar receiver can directly set the sampling rate associated with the digital-values that are provided by the ADC 610, based on an index of the slow time axis.

In the example of FIG. 6, an existing clock input to the ADC 610, e.g. a flash type ADC, can be modified from a constant input frequency to one that has a slight linear frequency ramp. In some examples, such a frequency ramp can have a constant centre frequency and constant slope, which is independent of any radar object knowledge, without disturbing the accuracy or other desirable properties of the ADC.

Figure 7:
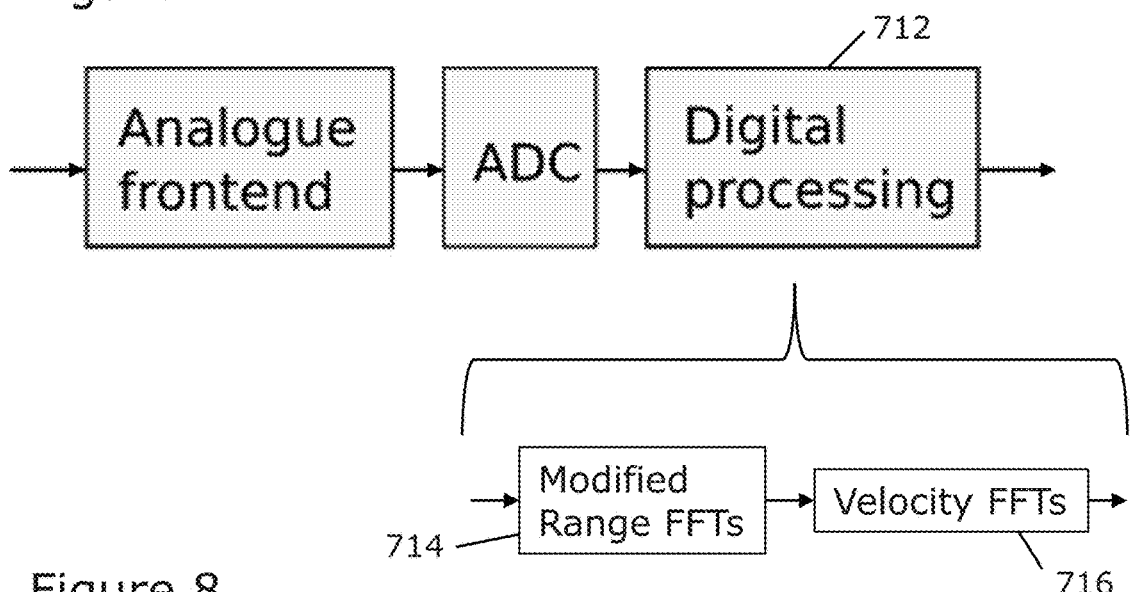
FIG. 7 shows another example of a radar receiver, in which the digital processor applies modified range FFT calculations in order to effectively set a sampling rate associated with the bin-values in the 2-dimensional array.

FIG. 7 shows another example of a radar receiver, in which the digital processor 712 applies modified range FFT calculations 714 in order to effectively set a sampling rate associated with the bin-values in the 2-dimensional array.

In FIG. 7 the digital processor 712 initially populates the 2-dimensional array of bin-values based on the digital-values. That is, it copies the digital-values directly into the 2-dimensional array without necessarily processing or modifying the digital-values. The digital processor 712 then performs modified range FFT calculations on the bin-values in the 2-dimensional array along the range axis in order to determine the range/distance to any detected objects, wherein the modifications are based on the index of the slow time axis. Then velocity FFTs 716 can be performed on the 2-dimensional array in order to determine the velocity of the detected objects.

In one example, the FFT calculations are modified by applying a mathematical operation to a component of the FFT calculation, wherein the magnitude of the mathematical operation is based on the index of the slow time axis. For instance a multiplication factor can be applied to the exponent in the FFT calculation, wherein the multiplication factor is based on the index of the slow time axis. Alternatively, a variable offset can be added to the exponent in the FFT calculation, wherein the variable offset is based on the index of the slow time axis.

In another example, the FFT calculations can be modified by adding or removing bin-values of the range FFT based on the index of the slow time axis.

Advantageously, a modified range FFT calculation 714 for a row of data in the 2-dimensional array can be performed as soon as the associated radar symbol has been received. That is, the radar receiver does not need to store an entire frame/data cube of radar data in computer memory before a modified range FFT 714 can be performed. Therefore, this example does not have a requirement for a large amount of computer memory in order to function.

The radar receiver of FIG. 7 does incur some cost for the additional computations relative to an unmodified FFT. However, a need for extra frame storage or other additional expensive circuitry can be avoided.

Figure 8:
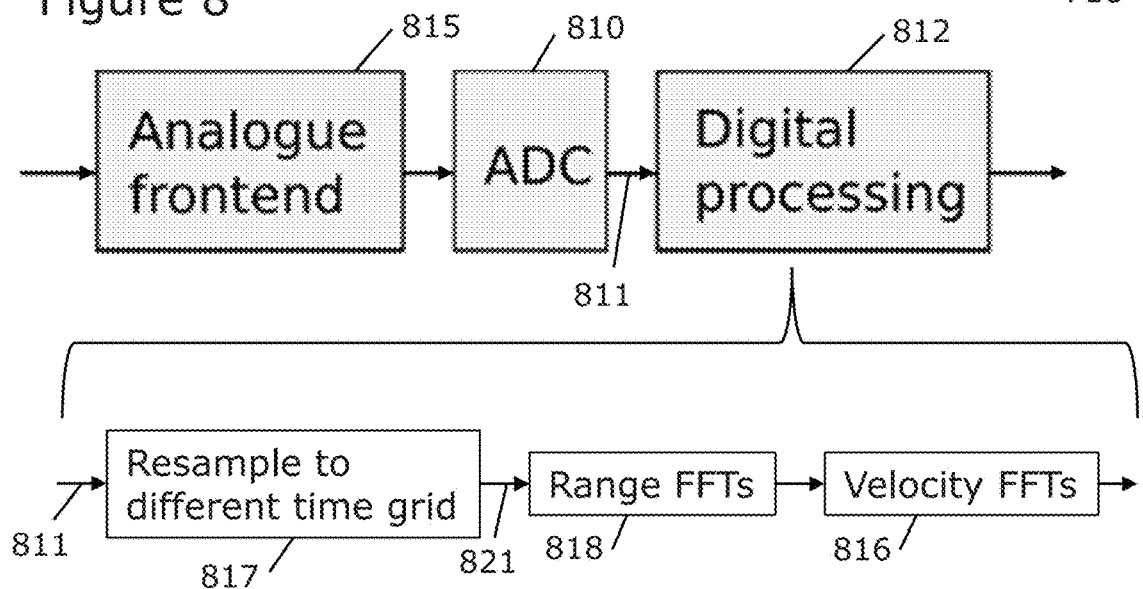
FIG. 8 shows another example of a radar receiver, in which the digital processor resamples the digital values of the digital signalling in order to effectively set the sampling rate associated with the bin-values in the 2-dimensional array.

FIG. 8 shows another example of a radar receiver, in which the digital processor 812 resamples the digital values of the digital signalling 811 in order to effectively set the sampling rate associated with the bin-values in the 2-dimensional array based on the index of the slow time axis.

In this example, the digital processor 812 includes a resampler 817, which resamples the digital-values to generate resampled-digital-values 821, such that the sampling rate associated with the resampled-digital-values 821 is based on the index of the slow time axis. As is known in the art, this can involve interpolating between the digital-values to determine the resampled-digital-values 821. In another example, the resampler 817 can be provided as part of the ADC 810, or as a separate component in between the ADC 810 and the digital processor 812.

The digital processor 812 can then populate the 2-dimensional array of bin-values with the resampled-digital-values 821, and subsequently perform the range FFTs 818 and velocity FFTs 816 as usual. In this example, there is no need to adjust the sampling frequency of the ADC 810—i.e. the ADC 810 can use a constant sampling rate to generate the digital signalling 811.

Advantageously, the example of FIG. 8 leaves both the analogue frontend 815 and the FFT calculations 818, 816 that are performed by the digital processor 812 unchanged. Instead, a new processing function is introduced in the mixed signal part of the chain; that is, in between the analogue and digital parts. This can be considered as a highly configurable down-sampling unit. This processing can be implemented within an IC area and power consumption that are a small fraction relative to that of the entire radar chip whilst significantly improving its performance, as will be shown below.

Each of FIGS. 6 to 8 describe different ways of setting a sampling rate associated with the bin-values in the 2-dimensional array based on an index of the slow time axis. The additional IC area and power consumption in each of the implementation options is deemed small relative to that of an entire radar chip. One or more of these examples can be extended with the following functionality:

setting the sampling rate associated with the bin-values in the 2-dimensional array also based on an index of the range axis. That is, such that the sampling rate varies from bin to bin along the range/fast axis (in the horizontal dimension, as it is shown in FIG. 2) in addition to varying from bin to bin along the velocity/slow axis (in the vertical dimension, as it is shown in FIG. 2). Especially for the example of FIG. 6, this can be advantageous because a continuous function can be applied to the clock signal such that the frequency is gradually increased or decreased for each digital-value in a frame of radar data (that will be used to populate a single 2-dimensional array).

setting the sampling rate associated with the bin-values in the 2-dimensional array also based on the speed of a vehicle to which the radar receiver is fitted. The speed could be obtained e.g. via GPS, vehicle network, internal speedometer or derived from the radar waveform itself (ego-motion estimation).

Examples disclosed herein can avoid a need to reverse the range- and velocity-FFTs (i.e. such that the velocity-FFTs are performed before the range FFTs), and therefore also the expense that is associated with such a reversal can also be avoided. These expenses include the memory storage needed to reverse the range- and velocity processing, and the faster signal processing that is needed to compensate for the extra signal latency that is caused by the reversal. Such a reversal is required by the processing that is described in each of the following papers:

R. P. Perry, R. C. DiPietro, R. L. Fante, "Coherent integration with displacement using keystone formatting," Proc. IEEE Nat. Radar Conf., May 2007. pp. 432-436, 2010.

J. Xu, J. Yu, Y-N. Peng, Joint Radar Wideband Beamforming and Long-Time Coherent Integration Via Radon-Fourier Transform, 2011 IEE CIE Intl. Conf. on Radar, 2011.

J. Xu, J. Xu, Y-N. Peng, X-G. Xia, Radon-Fourier transform for Radar Target Detection (III): Optimality and fast implementations, IEEE Trans. on Aerosp. and Electr. Systems, Vol. 48, No. 2, April 2012.

The examples that are disclosed herein are superior to alternative methods for compensating for object displacement during measurement in radar receivers. Firstly, for methods that vary a parameter of the analogue receiver frontend during the reception of a frame radar measurement. Given that the high linearity and other requirements on radar receiver frontends are already difficult to meet, the increase in implementation cost and complexity that is associated with maintaining these accuracy requirements in the presence of dynamically changing frontend parameter is unacceptable within some markets, such as the automotive market. Secondly, compensation methods in the digital domain can require high memory usage and other high digital hardware costs.

In contrast, examples that are described herein can be considered as operating in the mixed signal part of the radar receiver as the combined analogue, digital circuitry that performs the analogue-to-digital conversion (ADC). One implementation of the method disclosed herein only needs the introduction of a highly configurable down-sampling unit in the mixed signal part of the receive chain, which needs a relatively small IC area and power consumption relative to the total chip area while significantly enhancing its performance. Another implementation modifies the range processing in the digital chain, albeit without creation of the need for extra frame storage. The analogue and mixed signal parts of the processing chain are left unchanged. A further still implementation is possible in the context of an ADC that continues to perform reliably if its fixed clock frequency input is varied in frequency during the radar measurement over a frequency interval that is small relative to the original ADC clock frequency. None of these implementations create the need for additional, expensive or high power consuming circuitry in a radar chip.

Turning now to a detailed description of an example of the present disclosure, the following variables are introduced:

M the number of chirps (or pulses, etc.) in a radar frame measurement,

N the number of digital samples in a range-FFT, aspect ratio $\alpha = M/N$, $T_{sample}$ is the effective sampling rate after resampling chirp time $T_{chirp} = N\ T_{sample}$. $T_{chirp}$ can refer to the chirp time including overhead (settle/reset times). In some examples, the overhead can be ignored for simplicity and the active chirp duration can be used as the value for $T_{chirp}$, frame time also called frame measurement time $T_{frame} \times M\ T_{chirp}$, elapsed time since the start of a chirp, also referred to as fast time t in between 0 and $(N-1)\ T_{sample}$ that is the part of the frequency ramp used for ideal acquisition, start time of a chirp sequence, also referred to as slow time T in between 0 and $(M-1)T_{chirp}$ at stop time of a chirp sequence.

normalized fast time index $x=(t/T_{chirp})$ in between 0 and 1, normalized slow time index $y=(\tau/T_{frame}) -0.5$ in between $-0.5$ and $0.5$, constant within a chirp, speed of light c, center frequency of the linear frequency ramp $f_0$, frequency ramp bandwidth B, wavelength $\lambda = c/f_0$ angular wave number $k = 2\pi/\lambda$ narrowband ratio $\varepsilon = B \div f_0$, amplitude A of the received beat/IF signal range r of the radar object relative radial velocity v of the radar object displacement during the measurement $d = v\ T_{frame}$ The beat/IF signal for an object at range r and with velocity v can be modelled as follows:

$$b(x, y) = A \exp (j2k(1+x\varepsilon)(r+y\ d)) \quad (1)$$

Note, that at the end of the slow time axis, that is at y=1, the range of the object has increased from the range value at the start of the frame defined as r to a final range of r+d.

Having this expression for the beat/IF signal, one can derive a matched filter for an ideal radar point object with a given range r and specific velocity v (displacement d) as:

$$B(r,v)=\Sigma_x\Sigma_y b(x,y) \exp(-j2k(1+\varepsilon x)(r+yd)).$$

Such a theoretical matched filter then would have to be defined for each (r,v)—point in the range—Doppler map. This approach would be highly accurate, but is also the most computationally complex method. The beat/IF signal formula can be simplified to neglect the cross product xy term, which is especially relevant for use cases in which the range migration within a chirp is negligible. This turns the beat signal model into a 2D frequency or phasor signal that can be analysed using range Fourier transforms along the ADC-rows and Doppler Fourier transforms along the ADC-columns. Taking the range Fourier transforms first is advantageous because reception of the ADC samples in the radar receiver happens along the fast time direction. Furthermore, storage in memory of range spectra more easily allows efficient sample compression prior to storage as compared to storage of plain ADC samples.

Note, that, in general, in Eq. (1) the velocity v only impacts the beat signal through the product with the frame measurement time $T_{frame}$, that is the displacement d in meters. Apart from the common factor j2k, elaboration of the product of 1+εx and r+d y yields the four terms.

r constant phase offset,
y d drives the velocity-FFT frequency component, as in the classic model, along slow time,
y d x ε interaction term between x- and y-axis of enhanced model,
xεr drives the range-FFT frequency component, as in the classic model, along fast time.

Note, that the new interaction term of the third bullet can be combined with the original term that drives the velocity-FFT component into a combined term d y (1+xε). This grouping of terms interprets as that a factor $$1+x\varepsilon \quad (2)$$

has scaled the perceived slow time y.

A beneficial aspect of this approach is that the above scaling factor of Eq. (2) of slow time is independent of the range and velocity of the object, hence, can be taken account of independent of radar object knowledge.

However, a high cost arises in implementations that slow time processing has to be carried out, such that the above scaling factor can be taken account of, prior to the fast time processing being performed. The customary processing order in radar receiver is to conduct fast time processing prior to slow time processing, that is, range processing prior to velocity processing. If this processing order is reversed, in order to take account of the scaling of the slow time axis as in Eq. (2), it:

creates the need to postpone frame processing until the entire frame has been received,
causes extra receiver latency towards the application that uses the radar,
makes it difficult to avoid faster digital processing hardware to at least partially compensate for the latter latency,
etc.

The above cost increases are significant, and can be prohibitive in the current and near future market for automotive radar chips.

AN EXAMPLE OF THE PRESENT DISCLOSURE

Grouping the above bulleted terms of the third and fourth bullets into ε×r(1+y (d÷r)) interprets as that a factor $$1+y(d\div r) \quad (3)$$

has scaled the perceived fast time x. With a focus on compensating for the loss incurred through motion blur for objects with "high velocity and high range", we choose:

d to be equal to the displacement $d^+$ that corresponds to the maximum unambiguous velocity $v^+$ of the radar, which corresponds to one RF wavelength of change of the two-way propagation distance from the radar to the object and back $$v^+=Mc/(4f_0 T_{frame}) \quad (4)$$

Evaluation of $d^+=T_{frame} v^+$ yields:

$$d^+=Mc/(2f_0) \quad (5)$$

r to be equal to the maximum unambiguous range $r^+$ for a complex receiver $$r^+=Nc/(2B). \quad (6)$$

Substitution of Eqns. (5), (6) into ratio Eq. (3) yields a fast time scaling factor $$1+y(d^+\div r^+)=1+y\alpha\varepsilon \quad (7)$$

where the aspect ratio α equals M/N, and the narrowband ratio ε equals B÷$f_0$, as defined above. Observe, that the fast time sample rate, that is, the effective ADC sample rate needs to change slightly from chirp to chirp. Within a chirp, the sample rate is held constant. The fractional sample rate change from the start of the chirp sequence to the end of the chirp sequence equals a fraction of αε, which in many cases of practical interest can be assumed to be small. Then, the fractional sample rate change from a chirp to the next chirp of αε/M is tiny. In such cases, if it offers implementation advantages with respect to making the sample rate variable, to change the effective baseband sample rate in a continuous manner as opposed to in small steps in between chirps, it can be acceptable to have the effective ADC sample rate in a continuous manner as well, depending on (simulated) correction algorithm performance evaluations.

Example—Note, that for square 2D FFT's, we have α=1 and the fast time scaling factor for a maximum unambiguous velocity and a maximum unambiguous range reduces to $$1+y\varepsilon \quad (8)$$

That is, the weight on the normalized y-coordinate in (8) equals the weight on the normalized x-coordinate in (2).

Generalization to Compensation for High Velocity at Small Range for FMCW Radars

In case of FMCW radar in which the transmitted radar signal consists of a sequence of repetitions of a chirp, in which the received signal is mixed with the transmitted signal in order to obtain a beat signal, as described above, objects at relatively high distance from the radar antenna and objects at relatively small distance from the radar antenna can be interchanged, by mixing the beat signal with a fixed (digital) frequency. The introduction of such a fixed frequency shift per data cube, that is per frame measurement time, to the beat signal along fast time, can convert beat signal corresponding e.g. to a high velocity approaching car at close distance that is highly relevant to detect from a car safety point of view into a beat signal in a part of the range-FFT spectrum in which the motion blur method described above already was effective. Note, that the effect that the multiplication with a fast time phasor signal is affected by the slight change of sample rate associated by our method as well.

Adaptive Choice of Correction Parameter Values

The differential radar receiver sensitivity achieved by methods disclosed herein across the supported-RV plane can be analysed at design-time of the hardware, software of the radar product for multiple values of these correction parameters. At run-time of the radar chip, that or those correction parameters may be selected for which the corresponding differential radar sensitivity Range-Doppler map best matches the purpose of the upcoming radar measurement, given the state of the presence/absence of knowledge about the presence/absence of radar objects at the time of the upcoming radar measurement. E.g. in case a car contains multiple radars, such parameter decisions may also be coordinated between these radars.

Example of a Linear Point Motion Point Object

Consider the following complex valued FMCW radar system. A real valued receiver would require slight adaptations in the formulas below. Similar examples may be considered for pulse based or OFDM based or other radar systems as well.

Assume the object has a relative radial velocity of v=200 km/h, which is equivalent to v=200/3.6 m/s.

$d_0$=300 m is the distance of the object at the maximum range limit at the first chirp to the radar $T_{chirp}$=18 µs is the active chirp duration $T_{chirp,rep}$=30 µs which is the length of the pulse repetition time interval that includes the active chirp time and equals the sampling time in the sense of Nyquist sampling from one chirp to the next in the vertical ADC-column FFT that computes the velocity spectra along slow time.

$N_{samples}$=1024 is the number of ADC samples per chirp, used in the FMCW range FFT.

$N_{chirps}$=1024 is the number of chirps per frame, i.e. the length of the velocity-FFT's.

$d_{prb}$=$d_0/N_{samples}$=300 m/1024=0.3 m/'range bin' is part of the range axis that corresponds to one range-FFT frequency component, that may be called range resolution.

$N_{vrb}$=$vT_{chirp}/d_{prb}$=(200 km/h) 18 µs/0.3 m per bin=0.003 range bin of motion from one chirp to the next.

$d_{osspr}$=$vT_{chirp,rep}N_{sequence}$≈(200/3.6 m/s) 1024 30 µs ≈1.6 m object displacement during the frame.

$d_{osspr}/d_{prb}$=1.6 m/0.3 m=5.3 range bin of object motion during frame measurement.

Figurative Explanation of Working of the Method

Figure 9:
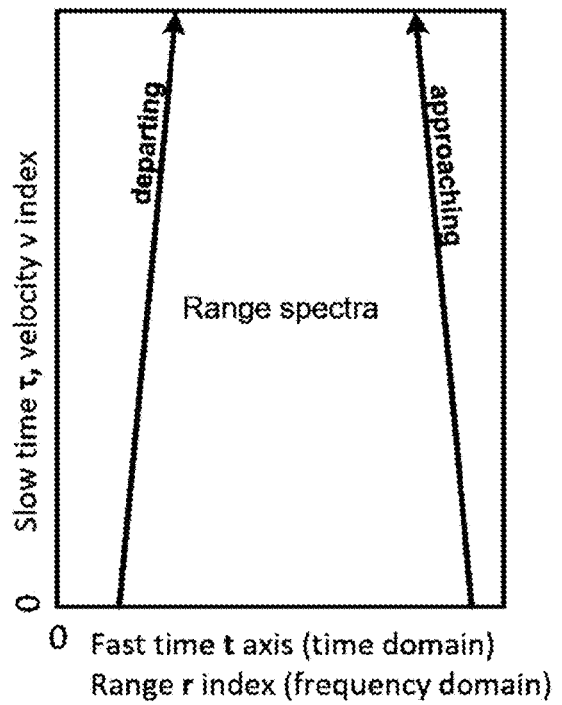
FIG. 9 shows a sequence of FMCW range spectra as a function of chirp index.
Figure 9:
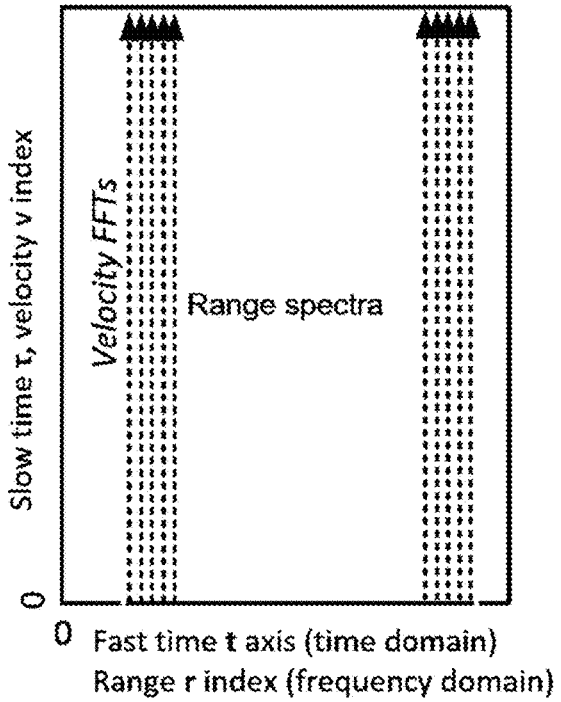

FIG. 9 shows a sequence of FMCW range spectra as a function of chirp index, and the range of an object changing as a function of that index over a number of range bins as a result of its (presumed constant) velocity (during the frame).

The energy in the 2D range spectra associated with the object is distributed over a number of fast time-columns, hence, bringing the signal strength 'per fast time column' closer to the noise floor, hence, also the peak height after the per-column velocity-FFT closer to the noise level.

FIG. 9 illustrates how the energy of an ideal linear motion point object has a linear trajectory across the sequence of successive range measurements per FMCW radar chirp (pulse radar' pulse, OFDM radar symbol). The energy in the fast time columns, that is along slow time, already have a lower energy at their input, and hence also produce lower detected peak heights at the FFT output as compared e.g. to a fixed noise floor, impeding detectability of objects e.g. with small radar cross section.

In FIG. 9 it is shown how the fact that trajectory of the energy, associated with an ideal object moving at a high velocity, is a line that is angled/twisted away from a purely vertical column can be compensated by a matched reformation of the 2D range support axis.

Per chirp a small range offset is applied, where the first-to-last chirp difference of these range offsets approximately equals the displacement of the ideal point object during the frame measurement (e.g. 5 or 6 range bins).

In case of FMCW radar such a slight chirp-index-dependent range offset can be implemented through application of a slight frequency shift per chirp prior to regular digital receiver baseband processing.

Note, that a beat signal frequency shift over 1 range bin corresponds to a complex-valued phasor signal that performs exactly one rotation over the circle in the complex plane over the $N_{samples}$ ADC samples per chirp.

The end-to-end frequency beat frequency shift across e.g. 5 or 6 range bins is divided up into $M_{chirps}$ tiny steps in this digital mixer frequency from one chirp to the next.

According to Nyquist sampling theory, the true shift of the beat signal that results in the range spectrum per chirp is a cyclic shift, as the fast time sample rate remains unchanged, the shift has to be interpreted into a modulo fashion as is customary with Nyquist sampling and is known to people skilled in the art.

Figure 10:
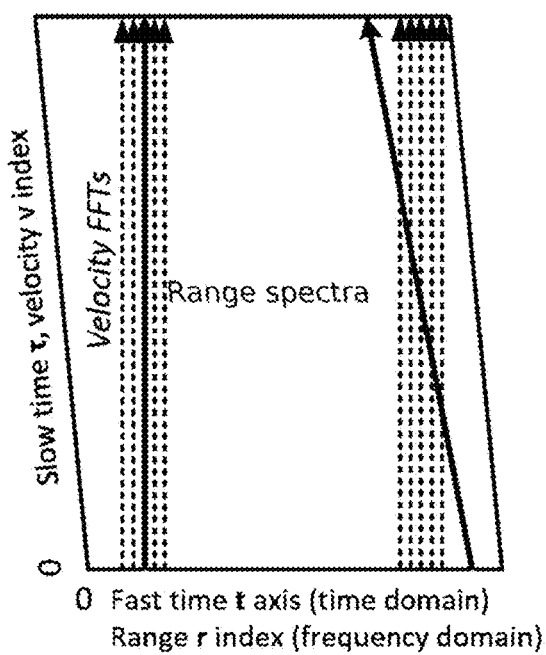
FIG. 10 shows how a size of the range frequency axis could be maintained, but a slight range shift is applied per chirp, that varies linearly across the sequence of successive chirp measurements, in order to match the trajectory of the (high) velocity of particular interest during the (active) radar measurement time interval.
Figure 10:
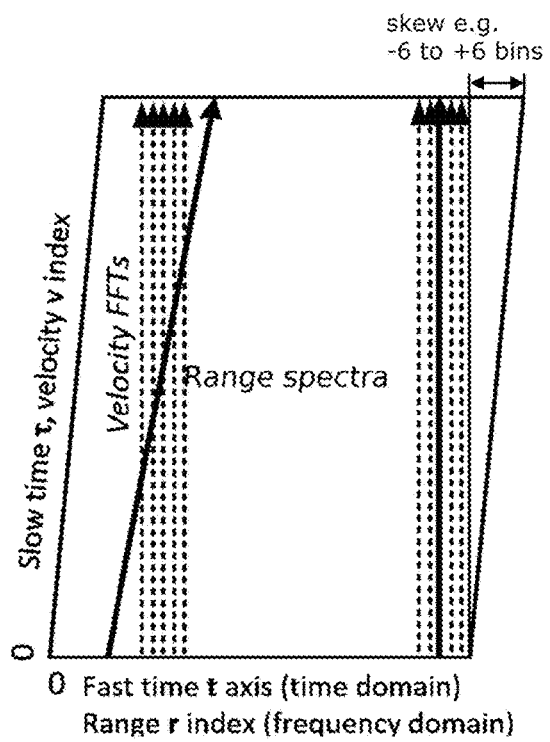

FIG. 10 shows how a size of the range frequency axis could be maintained, but a slight range shift is applied per chirp, that varies linearly across the sequence of successive chirp measurements, in order to match the trajectory of the (high) velocity of particular interest. In FIG. 10, a skew of −6 to +6 bins is approximated by a shift of range indices for objects with the same velocity and direction. However, the processing that is required to implement the functionality that is represented by FIG. 10 for the whole scale of high velocities, resp. performing all skews between −6 and +6 bins from the example, is complex and requires a large amount of computer memory. FIG. 10 does not involve any change in the sampling rate. Less compute power and memory is required, if a few use cases are picked out, e.g. including a worst case for maximum velocity of an approaching object.

Figure 11:
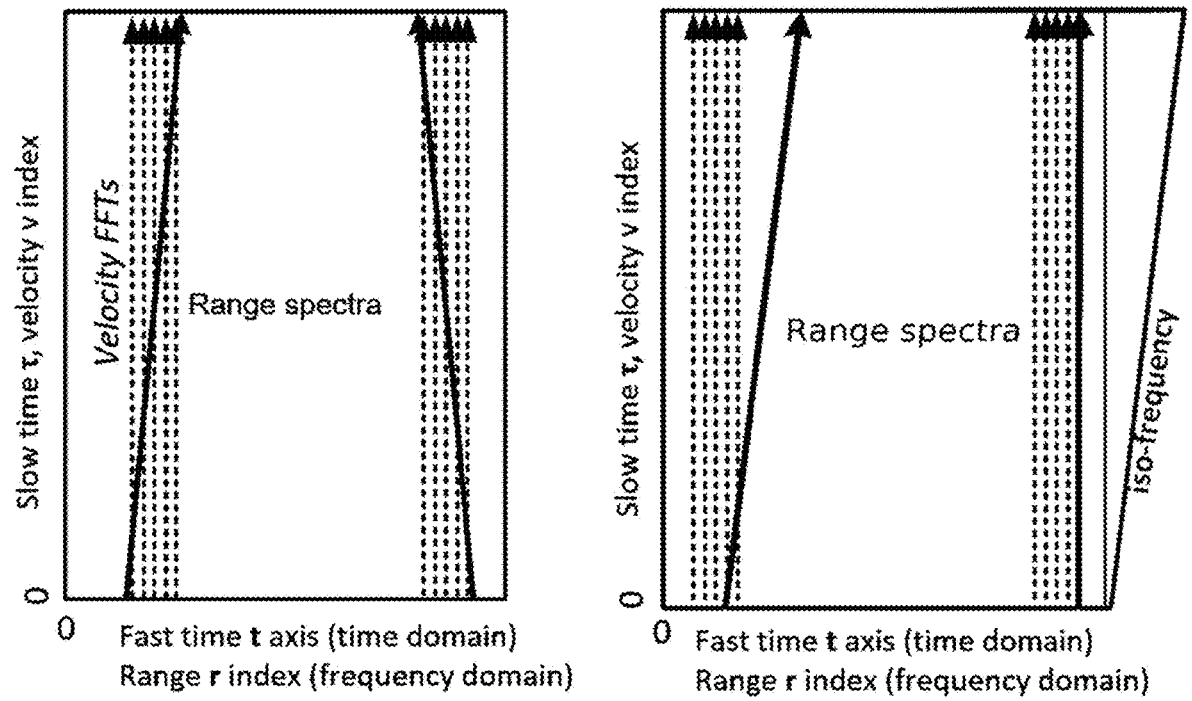
FIG. 11 schematically shows how, for an example embodiment of the present disclosure, the length of the (unambiguous) range axis can be slightly (linearly) stretched in order to match the ratio of the displacement of an object during the measurement time d divided by the distance of the object to the radar also called range r of objects of high interest.

FIG. 11 schematically shows how, for an example embodiment of the present disclosure, the length of the (unambiguous) range axis can be slightly (linearly) stretched in order to match the ratio d÷r of objects of high interest. The "d÷r of objects of high interest" is an example of a targeted range/velocity ratio. E.g. objects at the maximum unambiguous range $r^+$ and at the maximum unambiguous velocity $v^+$ (or a multiple thereof, extracted though disambiguation techniques known to people skilled in the art of radar receiver techniques).

Instead of applying a different range-, resp. frequency shift from one chirp to the next (as shown in FIG. 10), for example embodiments of the present disclosure, the length of the range axis per chirp is slightly moved from one chirp to the next, in order to match trajectory of objects of particular interest with a given ratio of displacement and range d÷r. This is equivalent to these objects having a particular ratio of velocity and range v/r as presented in Eq. (7). Observe that the stretching factor of the range axis has a larger absolute effect at larger range values as compared to small range values. In this way, the beneficial effect of the method of the present disclosure as it is shown in FIG. 11 is focussed on a combination of objects at high range, hence, experiencing large two-way radio propagation loss from the radar transmit antennas to the radar object and back to the radar receive antennas, and significant smearing of the radar received signal energy associated with the radar object across a number of successive range bins, thus impeding detectability of the object relative to a channel noise floor.

Figure 12:
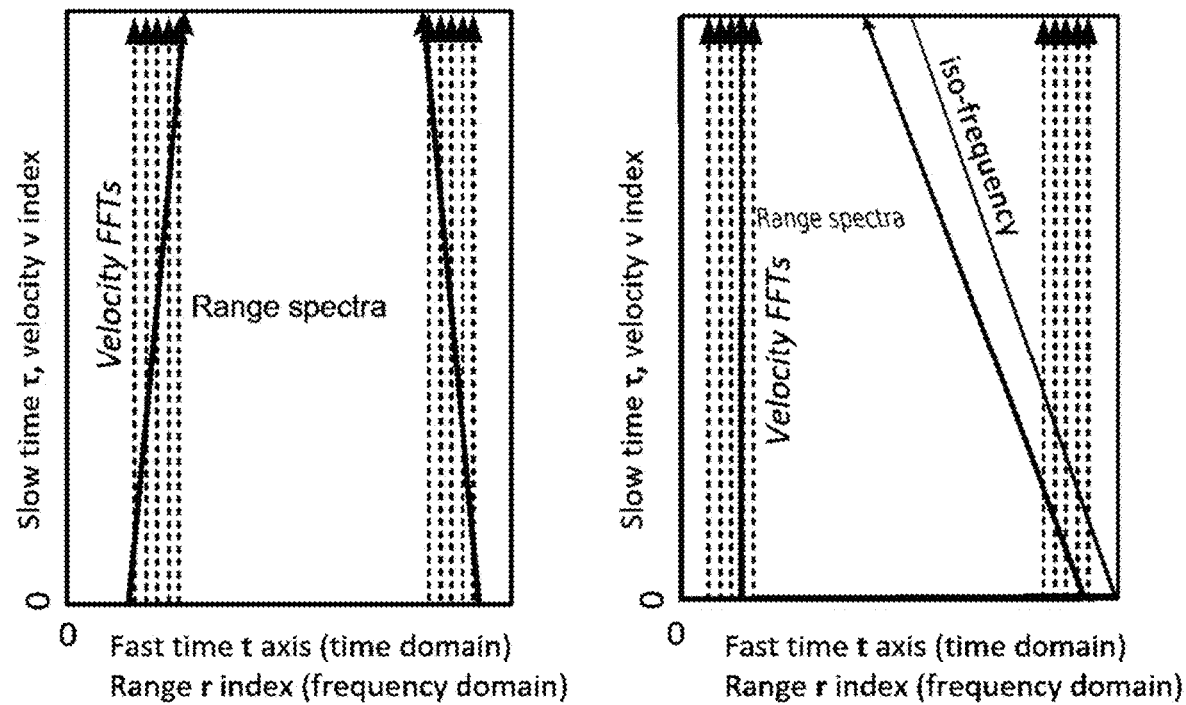
FIG. 12 schematically shows how, for an example embodiment of the present disclosure, the length of the (unambiguous) range axis can be slightly (linearly) compressed in order to match the ratio d÷r of objects of high interest.

FIG. 12 schematically shows how, for an example embodiment of the present disclosure, the length of the (unambiguous) range axis can be slightly (linearly) compressed in order to match the ratio d÷r of objects of high interest.

In this example, benefits of the invention are realised for departing objects that have a high relative velocity and a small range. This is instead of objects that have a combination of high relative velocity and high range, as is shown in FIG. 11. For FIG. 12, a fixed cyclic rotation of the range axis is applied for all chirps in order to convert the small range of objects into a larger range, followed by unaltered application of the method that is described above. The same principle also holds for negative relative velocities.

It will be appreciated that the functionality of the compression of the RV plane at the upper velocity indexes in FIG. 12 can also be implemented by stretching the RV plane for the lower velocity indexes. Similarly, the functionality of the stretching of the RV plane at the upper velocity indexes in FIG. 12 can also be implemented by compressing the RV plane for the lower velocity indexes.

One or more of the examples disclosed herein include redefining the origin of the range-velocity (RV) plane. The 2D origin of the RV plane can be shifted from (0,0) to $r_0, v_0$:

$$r = r_0 + (r - r_0) = r_0 + \Delta r$$

$$v = v_0 + (v - v_0) = v_0 + \Delta v$$

$$d = d_0 + (d - d_0) = d_0 + \Delta d$$

with $d_0 = T_{frame} v_0$ and $\Delta d = T_{frame} \Delta v$

In this way, the range-velocity coordinates (r, v) are shifted by an offset relative to the origin ($r_0$, $v_0$). This can enable an offset to be accounted for in a targeted range/velocity ratio by applying a non-zero offset to either or both of the range and the velocity in the targeted range/velocity ratio. For instance, ego-motion estimation can be performed by applying an offset ($\Delta v$) to the velocity in a targeted range/velocity ratio, wherein the size of the offset is based on the speed of the vehicle. Then, the sampling rate associated with the bin-values in the 2-dimensional array can be set based on the targeted range/velocity ratio.

Application of Method Independent of Knowledge of Velocity Disambiguation Index of Radar Objects Advantageously, the methods that are disclosed herein apply a slight sample rate change per chirp purely within a single such measurement. If the rotation of complex-valued IQ equivalent baseband samples in the obtained range distribution for a given chirp to a successive measurement in a next chirp includes an unknown integer multiple number of $2\pi$ rotations is immaterial. This is because methods disclosed herein scale the range axes per chirp per ADC-row. The topic of resolution of ambiguity along the ADC-columns in the Doppler spectra, in this sense, are orthogonal topics, which don't interfere with each other. Hence, examples of the method that are disclosed herein can be applied independently of knowledge about the disambiguation index of radar objects. It is truly irrespective of whether or not velocity disambiguation is applied or is not applied that the ratio of displacement of range of the objects of highest interest to be favoured in the 2D range-velocity radar receiver sensitivity map needs to be known prior to reception of a frame.

Extraction of Velocity Disambiguation Index of Radar Objects Through Multiple Applications of the Method If multiplication of the implementation cost of the baseband processing is not an implementation concern, then the method disclosed herein can be applied in parallel employing different v/r parameter values for different parallel copies of the proposed method. For objects for which the true ratio more closely matches the ratio set in the copy of method at hand, the detected peak height, in general, is higher than in parallel executed copies of the method that match the set parameter more poorly, especially if the original loss through range migration of such objects, e.g. as measured in dB loss of the detected peak height, is significant.

Including Acceleration of Radar Objects

The compensation of moving targets can be compensated on a chirp by chirp basis. In some cases the compensation relates to a linear evolution of distance while in others it relates to non-linear evolution.

In the latter case the evolution can be quadratic for objects with constant acceleration.

In this way, a non-linear function can be applied to the index of the slow time axis to set the value of the sampling rate.

This is in contrast to other examples, where a linear function is applied to the index of the slow time axis to set the value of the sampling rate. In such examples, the sampling rate associated with the bin-values in the 2-dimensional array based on the index of the slow time axis can be set such that the sampling rate for the maximum index of the slow time axis corresponds to a maximum range/maximum velocity of the radar receiver.

This can be considered setting the corner point of stretched 2-dimensional array that is shown on the right-hand side of FIG. 11.

Mitigating Influence of FFT Windowing Function

In order to deal with ranges and velocities of radar objects not corresponding to integer frequency indexes in the range- or velocity-FFT, it is possible to multiply the 2D beat signal (per receive antenna) with a 2D windowing function in order to improve the 2D frequency resolution (as opposed to the case where no windowing would be applied that would correspond to a so called rectangular window). Note, these windows emphasize the contribution to the velocity-FFTs of the central ADC-rows, de-emphasize the contribution to the velocity spectra of the range spectra and the top and bottom of the data frame. Consequently, the radar object displacement within the emphasized central ADC-rows needs to be significant before the degradation in detected peak height in the radar receiver becomes noticeable.

Simulation Results

Figure 13:
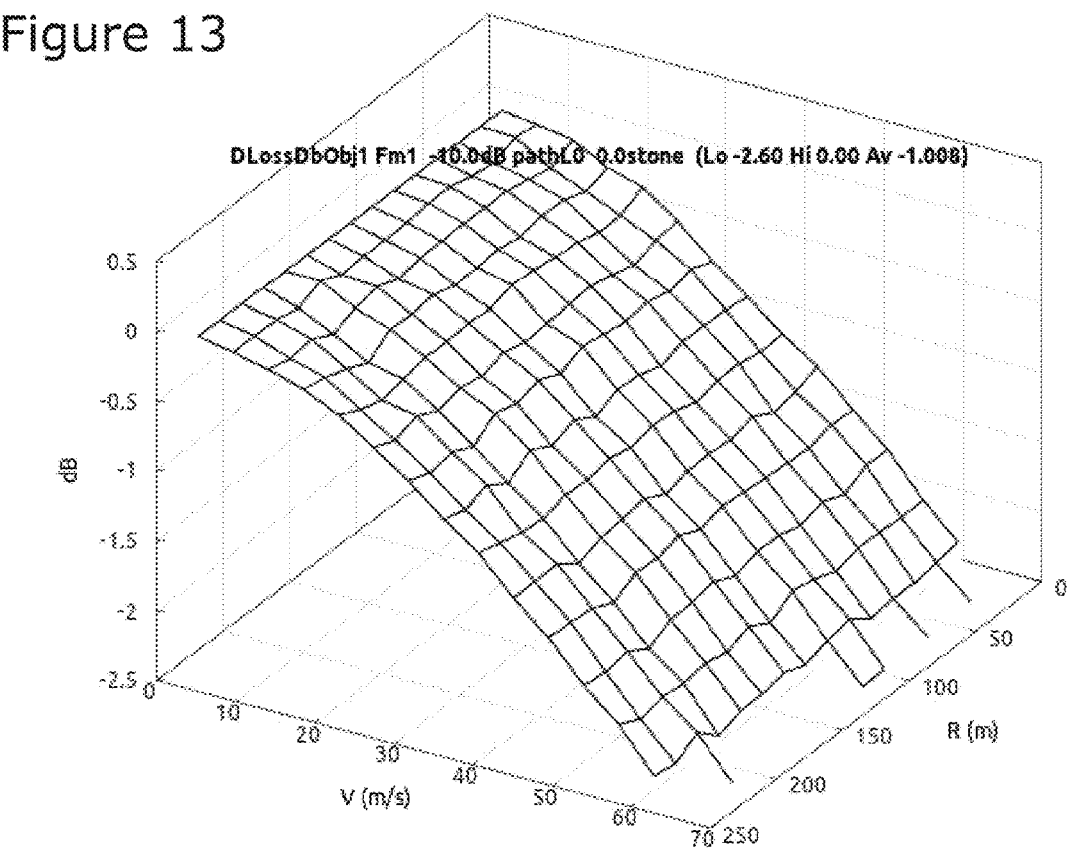
FIG. 13 illustrates the loss in detected peak height of linear ideal motion point objects, as a function of range and velocity, in dB without the compensation method of the present disclosure.

FIG. 13 illustrates the loss in detected peak height (as compared to velocity zero, no compensation) of linear ideal motion point objects, as a function of range and velocity, in dB without the compensation method of the present disclosure. FIG. 13 shows the results due to motion blur for a 1024×1024 FMCW radar system. FIG. 13 shows how the loss is reduced along the diagonal from zero range, zero velocity up to the corner of unambiguous range, unambiguous velocity of the 2D range-velocity domain of $v^+=72$ m/s and $d^+=250$ m.

Figure 14:
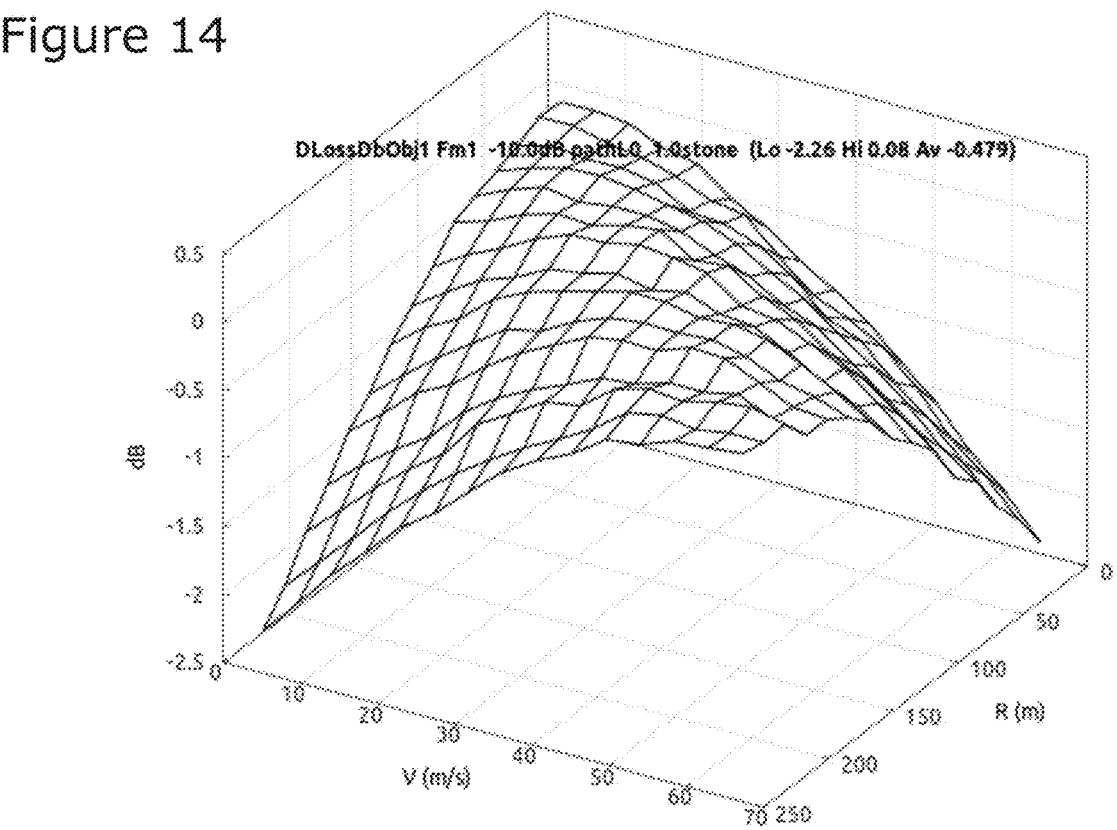
FIG. 14 illustrates the loss in detected peak height due to motion blur with nominal compensation according to an embodiment of the present disclosure.

FIG. 14 illustrates the loss in detected peak height (as compared to velocity zero, no compensation) due to motion blur for a 1024×1024 FMCW radar system in dB with nominal compensation according to an embodiment of the present disclosure. That is, the sampling rate for the maximum index of the slow time axis corresponds to the maximum range/maximum velocity of the radar receiver. In other words, the targeted range/velocity ratio corresponds to the maximum range/maximum velocity of the radar receiver. It can be seen that the losses at high range and high velocity are greatly reduced when compared with FIG. 13.

Figure 15:
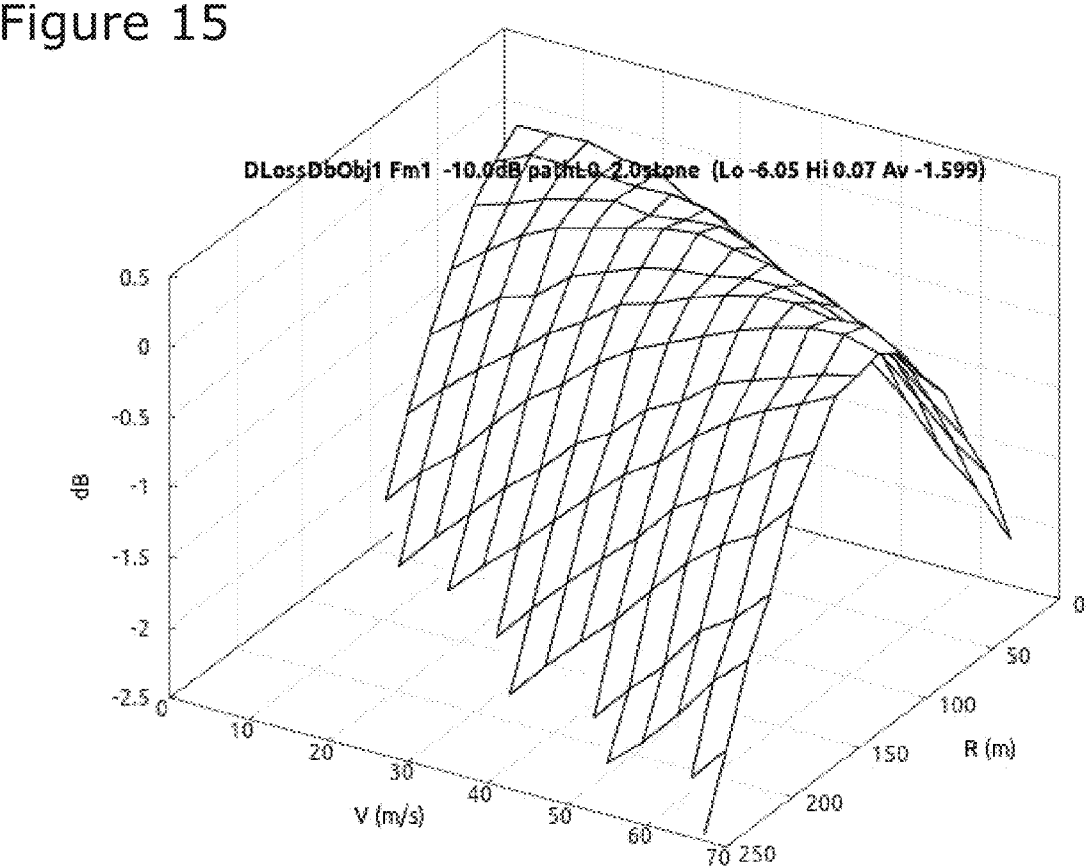
FIG. 15 illustrates the loss in detected peak height due to motion blur with 2× nominal compensation according to an embodiment of the present disclosure.

FIG. 15 illustrates the loss in detected peak height (as compared to velocity zero, no compensation) due to motion blur for a 1024×1024 FMCW radar system in dB with 2× nominal compensation according to an embodiment of the present disclosure. In this example, a 2× nominal sample rate change along the chirp sequence is applied such that the endpoint of the line in the RV domain that experiences full compensation has twice the original slope. FIG. 15 shows that the most significant reduction in losses has been translated to lower range values than is the case in FIG. 14. In other words, the targeted range/velocity ratio corresponds to: ½ the maximum range/maximum velocity of the radar receiver, such that motion blur compensation is focussed (i.e. most significant) on this specific range/velocity combination.

Radars Based on Other Waveforms Beyond Analogue Chirps e.g. Pulse-Based, OFDM-Based The above examples relate to FMCW radar as this is the type of radar that is currently of the highest practical interest in the automotive radar market. However, the principles described herein can also be applied for OFDM-based radar and pulse based radar. Examples disclosed herein can provide an advantage of a relatively low number of computations, and avoid a disadvantage of high memory cost that can occur when velocity processing is performed prior to range processing, which occurs from a reversal of the customary processing order that allows range processing to happen as received chirps, pulses, OFDM symbols stream into the digital receiver part from the ADC in the mixed signal part.

Examples disclosed herein relate to a concept in radar systems that is similar to the loss of detectability of photographic objects amidst background noise that can result from object motion during the shutter time. This is because the detectability of radar objects can be impaired when the displacement of an object during the data cube measurement time is nonnegligible. In general, a radar application specifies the maximum velocity of objects that need to be detectable. The consequence is an effective upper limit on the frame measurement time in the design of radar systems. A difference between radars and cameras—through the Doppler effect—is that radars can directly perceive the velocity of objects. As the velocity coordinate of an element of a range-Doppler map is known by definition, each such element can be corrected for the smearing that goes with that velocity. Some digital compensation methods, however, have an implementation cost that is prohibitive for application across the automotive market. One or more of the examples disclosed herein can lower the implementation cost of these digital methods through an interchange of the range and Doppler (velocity) coordinate axes which has an approximate validity e.g. in the high range, high Doppler part of the range-Doppler map that can be most critical with respect to sufficient sensitivity for object detection, and can be generalized beyond these parts of the radar map, as well.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A radar receiver comprising:
an analogue to digital converter, ADC, that is configured to sample analogue intermediate frequency, IF, signalling according to a sampling rate in order to generate digital signalling, wherein the digital signalling comprises a plurality of digital-values;

a digital processor that is configured to populate a 2-dimensional array of bin-values based on the digital-values, such that: a first axis of the 2-dimensional array is a fast time axis and a second axis of the 2-dimensional array is a slow time axis;

a sampling-rate-adjuster that is configured to set an effective sampling rate associated with the bin-values in the 2-dimensional array based on an index of the slow time axis; and wherein the digital processor is further configured to perform discrete Fourier transform, DFT, calculations on the bin-values in the 2-dimensional array along the fast time axis and the slow time axis in order to determine a range and velocity of any detected objects, the DFT calculations based on the effective sampling rate.

2. The radar receiver of claim 1, wherein the sampling-rate-adjuster is configured to set the effective sampling rate associated with the bin-values in the 2-dimensional array based on: (i) the index of the slow time axis; and (ii) a targeted range/velocity ratio.

3. The radar receiver of claim 1, wherein:
the digital processor is configured to populate the 2-dimensional array of bin-values based on the digital-values, such that each index of the slow time axis represents a different radar chirp in the IF signalling; and the sampling-rate-adjuster is configured to set a frequency-shift for each chirp based on its associated index on the slow time axis.

4. The radar receiver of claim 1, wherein:
the sampling-rate-adjuster comprises a clock unit, which provides a clock-signal to the ADC for setting the effective sampling rate of the ADC based on a frequency of the clock-signal;

the digital processor is configured to adjust the frequency of the clock-signal based on the index of the slow time axis; and the digital processor is configured to populate the 2-dimensional array of bin-values with the digital-values.

5. The radar receiver of claim 1, wherein:
the sampling-rate-adjuster is configured to resample the digital-values to generate resampled-digital-values, such that the effective sampling rate associated with the resampled-digital-values is based on the index of the slow time axis; and the digital processor is configured to populate the 2-dimensional array of bin-values with the resampled-digital-values.

6. The radar receiver of claim 1, wherein the sampling-rate-adjuster is configured to modify the DFT calculations based on the index of the slow time axis.

7. The radar receiver of claim 1, wherein the digital processor is further configured to:
apply an offset to one or both of the determined range and velocity in order to redefine an origin of a range-velocity plane.

8. The radar receiver of claim 6, wherein the sampling-rate-adjuster is configured to modify the DFT calculations by applying a mathematical operation to a component of the DFT calculations, wherein a magnitude of the mathematical operation is based on the index of the slow time axis.

9. The radar receiver of claim 1, wherein:
the sampling-rate-adjuster is configured to set the effective sampling rate associated with the bin-values in the 2-dimensional array based on an index of the slow time axis.

10. The radar receiver of claim 1, wherein:
the sampling-rate-adjuster is configured to set the effective sampling rate associated with the bin-values in the 2-dimensional array such that the effective sampling rate for the maximum index of the slow time axis corresponds to a maximum range/maximum velocity of the radar receiver.

11. The radar receiver claim 1, wherein:
the sampling-rate-adjuster is also configured to set the effective sampling rate associated with the bin-values in the 2-dimensional array based on a speed of a vehicle to which the radar receiver is fitted.

12. The radar receiver of claim 9, wherein the sampling-rate-adjuster is configured to set the effective sampling rate associated with the bin-values in the 2-dimensional array based on the index of the slow time axis, by applying a linear function to the index of the slow time axis to set the effective sampling rate.

13. The radar receiver of claim 9, wherein the sampling-rate-adjuster is configured to set the effective sampling rate associated with the bin-values in the 2-dimensional array based on the index of the slow time axis, by applying a non-linear function to the index of the slow time axis to set the effective sampling rate.

14. A radar system comprising:
a plurality of radar receivers, each radar receiver of the plurality of radar receivers including:
an analogue to digital converter, ADC, that is configured to sample analogue intermediate frequency, IF, signalling according to a sampling rate in order to generate digital signalling, wherein the digital signalling comprises a plurality of digital-values;

a digital processor that is configured to populate a 2-dimensional array of bin-values based on the digital-values, such that: a first axis of the 2-dimensional array is a fast time axis and a second axis of the 2-dimensional array is a slow time axis; and a sampling-rate-adjuster that is configured to set an effective sampling rate associated with the bin-values in the 2-dimensional array based on an index of the slow time axis;

wherein the digital processor is further configured to perform discrete Fourier transform, DFT, calculations on the bin-values in the 2-dimensional array along the fast time axis and the slow time axis in order to determine the range and velocity of any detected objects, the DFT calculations based on the effective sampling rate; and wherein the radar system includes a system processor configured to combine the velocity that is determined by each of the radar receivers to determine: a combined velocity value for a detected object, and optionally a direction to the detected object.

15. A method of determining velocity of a detected object, the method comprising:
sampling analogue intermediate frequency, IF, signalling according to a sampling rate in order to generate digital signalling, wherein the digital signalling comprises a plurality of digital-values;

populating a 2-dimensional array of bin-values based on the digital-values, such that: a first axis of the 2-dimensional array is a fast time axis and a second axis of the 2-dimensional array is a slow time axis;

setting an effective sampling rate associated with the bin-values in the 2-dimensional array based on an index of the slow time axis; and performing discrete Fourier transform, DFT, calculations on the bin-values in the 2-dimensional array along the fast time axis and the slow time axis in order to determine a range and velocity of any detected objects, the DFT calculations based on the effective sampling rate.

16. The method of claim 15, further comprising setting the effective sampling rate associated with the bin-values in the 2-dimensional array based on the index of the slow time axis and a targeted range/velocity ratio.

17. The method of claim 15, wherein the populating the 2-dimensional array of bin-values is based on the digital-values such that each index of the slow time axis represents a different radar chirp in the IF signalling.

18. The method of claim 15, further comprising generating resampled-digital-values, such that the effective sampling rate associated with the resampled-digital-values is based on the index of the slow time axis.

19. The method of claim 15, further comprising modifying the DFT calculations based on the index of the slow time axis.

20. The method of claim 15, further comprising applying an offset to one or both of the determined range and velocity in order to redefine an origin of a range-velocity plane.

* * * * *